(12) United States Patent
Chen

(10) Patent No.: US 6,717,571 B2
(45) Date of Patent: Apr. 6, 2004

(54) CURSOR MECHANISM WITH AN ENCODING FUNCTION

(75) Inventor: Ding-Yu Chen, Tao Yuan (TW)

(73) Assignee: Darfon Electronics Corp., TaoYuan (TW)

( * ) Notice: Subject to any disclaimer, the term of this patent is extended or adjusted under 35 U.S.C. 154(b) by 235 days.

(21) Appl. No.: 09/805,593

(22) Filed: Mar. 14, 2001

(65) Prior Publication Data

US 2001/0035857 A1 Nov. 1, 2001

(30) Foreign Application Priority Data

Apr. 28, 2000 (TW) ........................................ 89206965 U

(51) Int. Cl.$^7$ ................................................ G09G 5/08
(52) U.S. Cl. .......................... 345/157; 345/158; 345/159
(58) Field of Search ................................ 345/156, 157, 345/158, 159, 163, 184, 783; 108/147; 463/38; 318/568.11; 600/429

(56) References Cited

U.S. PATENT DOCUMENTS 5,287,804 A * 2/1994 Compagnone .............. 108/147
5,432,530 A * 7/1995 Arita et al. ................. 345/159
5,452,416 A * 9/1995 Hilton et al. ............... 345/783
5,805,256 A * 9/1998 Miller ........................ 348/734
5,963,197 A * 10/1999 Bacon et al. ............... 345/163
6,061,004 A * 5/2000 Rosenberg .................. 341/20
6,147,674 A * 11/2000 Rosenberg et al. ......... 345/157
6,154,201 A * 11/2000 Levin et al. ................ 345/184
6,248,018 B1 * 6/2001 Kehlstadt et al. ........... 463/38
6,515,650 B2 * 2/2003 Arita et al. ................. 345/156

* cited by examiner

Primary Examiner—Amare Mengistu
Assistant Examiner—Prabodh M. Dharia
(74) Attorney, Agent, or Firm—Troxell Law Office PLLC

(57) ABSTRACT

A cursor mechanism with an encoder function having a key member, an encoder input transmission member, a plurality of cursor input pressing members and a universal joint. The key member has an encoder rod extending from a center of a bottom thereof and a plurality of cursor rods extending downward from the bottom of the key member surrounding the encoder rod annularly. The transmission member has one end engaged with an encoder and another end connected to a free end of the encoder rod through the universal joint. The key member may be turned to trigger the encoder through the encoder rod and the transmission shaft for generating a respective encoding input signal. On the other hand, the key member may be eccentrically pressed to trigger the micro switch for generating a respective cursor input signal.

8 Claims, 5 Drawing Sheets

CURSOR MECHANISM WITH AN ENCODING FUNCTION

FIELD OF THE INVENTION

This invention relates to a cursor mechanism that includes an encoding function, and more particularly to a mechanism that integrates functions of a cursor and an encoder.

BACKGROUND OF THE INVENTION

In a conventional control apparatus, an encoder and a cursor control means are two essential elements that usually locate independently on a control panel. However, a trend of contemporary design for consumer electronic devices and the like has heavily focused on small size and lightweight. It is particularly true for some of the hot products now in the market place such as cellular phone sets, notebook computers, remote controllers, and other wire or wireless communication gears. Thus, the issue of how to reconfigure the cursor mechanism and the encoder into a limited space becomes a higher-ranking design consideration.

FIG. 1 shows a conventional design that to place the encoder in the center of a cursor mechanism. For saving the panel space, the encoder key 3 is surrounded by cursor pressing keys 2 on a control panel 1. However, it still exists some operational problems to be resolved. For example, to achieve the intend of arranging the encoder key 3 and the cursor pressing keys 2 into the limited space provided by the control panel 1 of the electronic device, both the keys 2 and 3 need to be produced to a relatively small size and to be arranged as close as possible. As one of bad sides upon such an arrangement, possible fault depression stroke might frequently occur while a user operates the control panel 1 by hand and fingers. Yet, it is clear that an improvement upon the arrangement of the encoder key 3 and the cursor pressing key 2 will be highly expected.

SUMMARY OF THE INVENTION

It is an object of this invention to provide a cursor mechanism that includes an additional encoding function for saving components' installation space within a control panel. The cursor mechanism utilizes an elastic member as a universal joint to couple an encoder so that the compact structure can integrate the encoder and the cursor and thus may perform both encoding and cursor functions.

It is another object of this invention to provide a cursor mechanism which may be turned to offer encoding input function and, on the other hand, may be depressed arbitrarily to offer cursor input function.

The cursor mechanism according to this invention includes a key member, an encoder input transmission member, a plurality of cursor input pressing members and a universal joint.

The key member has a top end and an opposing bottom end. The top end provides a means for turning and depressing application. The bottom end provides a protrusive encoder rod extending downward from a center of the bottom end and also includes a plurality of cursor rods surrounding the encoder rod.

The encoder input transmission member has one end engaged with the encoder and another end engaged with the encoder rod through the universal joint for transmitting encoder input from the key member to the encoder.

The cursor input pressing members are arranged with respect to the cursor rods for receiving respective pressing cursor input.

The universal joint provides an elastic link between the encoder rod and the encoder input transmission member for transmitting rotation or depressing action to generate encoder and cursor input signals, and it could be of a rubber sleeve, an elastic module, an universal joint structure or other link modules similar to such function.

In one embodiment of the present invention, the protrusive key member located on a control panel can be linked to the encoder input transmission member through the universal joint, and further connected to the encoder. In the aspect, a gap is maintained between the cursor input pressing member and the cursor rod, by which any unnecessary contact therebetween can be avoided in the case of no external application. By turning the key member, rotational input can be applied to the encoder. By pressing the key member eccentrically so as to make the cursor rod depressing the cursor input pressing member, a respective cursor input signal can thus be produced.

In the present invention, the gap between the cursor input pressing member and the cursor rod is required so that any interference between the encoder and the cursor functions can be avoided or can be reduced to a minimum degree under any circumstance of application.

The cursor input pressing member is the function of receiving pressing signal caused by pressing the key member eccentrically and contacting with the tilted cursor rod, and then transmitting the pressing signal to a relative cursor pressing signal producing members. The embodiment for the said cursor pressing signal producing members could be elastic keys, micro switches that relative to cursor rods, or other structures with similar function.

For more understanding, please refer to the following description with drawings.

BRIEF DESCRIPTION OF THE DRAWINGS

The invention, as well as its many advantages, may be further understood by the following detailed description and drawings in-which.

DETAILED DESCRIPTION OF THE PREFERRED EMBODIMENT

The following depicts various embodiments of this invention. Similar components will be marked by similar numerals to make reading and understanding easier.

Figure 1:
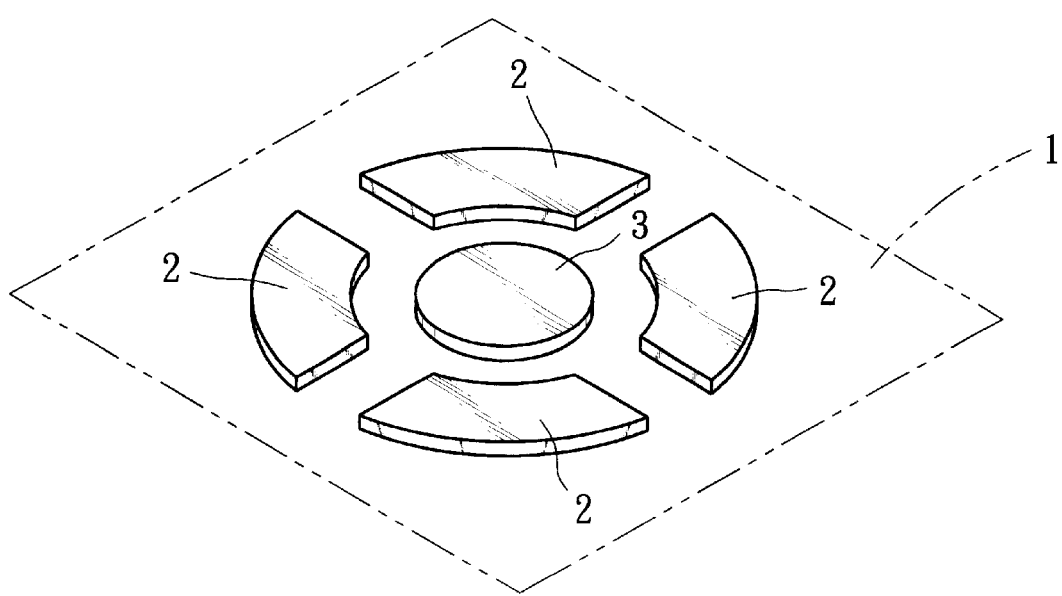
FIG. 1 is a perspective view of a conventional encoder and cursor control device mounted on a control panel.
Figure 2:
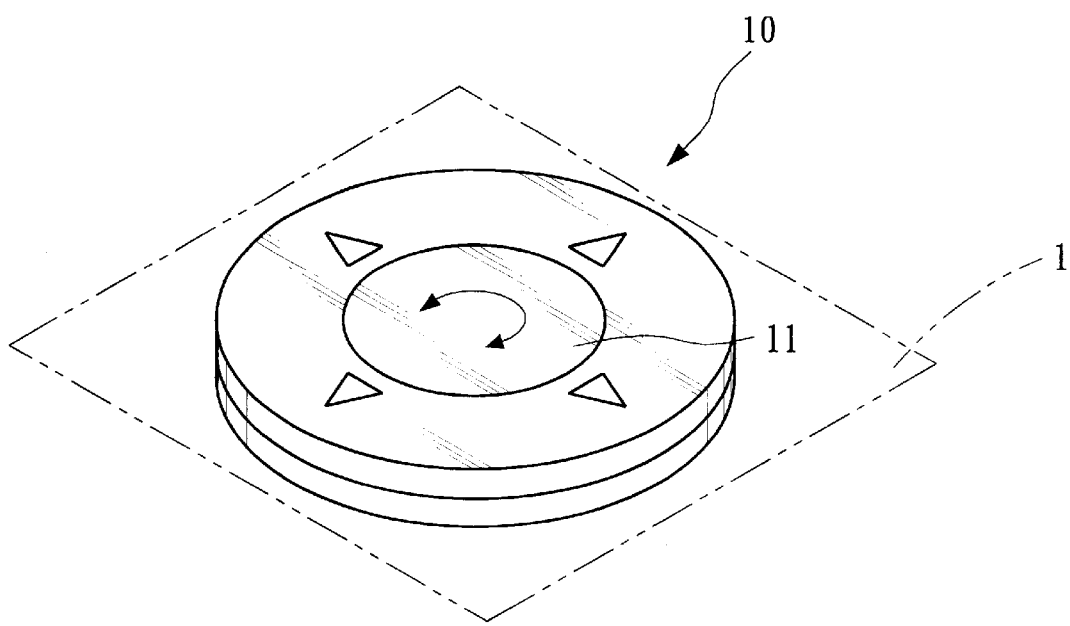
FIG. 2 is a perspective panel top view of this invention.

Referring now to FIG. 2, the cursor mechanism 10 according to this invention has a key member 11 that is mounted on a control panel 1 and may be turned and depressed to generate desired trigger signals.

Figure 3:
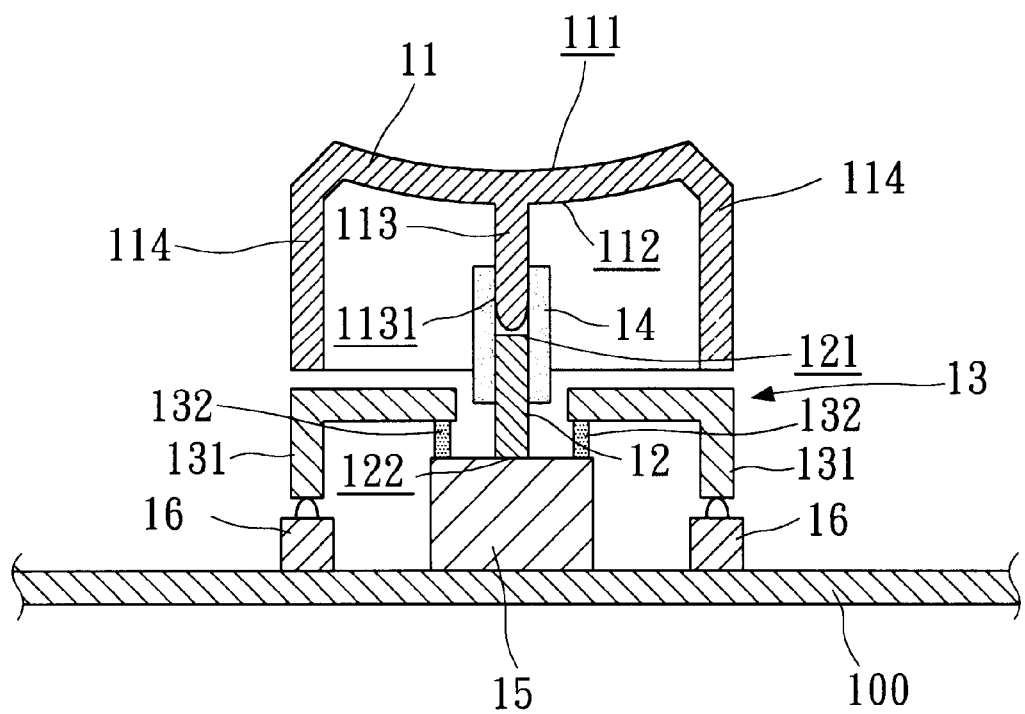
FIG. 3 is a sectional view of a first embodiment of this invention.

FIG. 3 shows a first embodiment of this invention mounted on a circuit board 100. It includes a key member 11 protrusive out of a control board (not shown in the figure), a plurality of cursor input pressing members 13, a universal joint 14, an encoder 15 which has an encoder input transmission member 12 and micro switches 16.

The key member 11 has a top end 111 for receiving turning and depressing input from people, an opposing bottom end 112 with a protruding encoder rod 113 at the center and at least one cursor rod 114 integrally formed with the key member 11 and surrounding the encoder rod 113 annularly.

The encoder input transmission member 12 is to transmit turning action from the key member 11 to the encoder 15 for generating the encoding signal. It has one end 122 engaged with the encoder 15 and another end 121 coupled with a free end 1131 of the encoder rod 113 by means of the universal joint 14.

The cursor input pressing member 13, located under the cursor rod 114 by a predetermined spacing, includes a rocker arm 131 having one end engaged with the encoder 15 through an elastic member 132 and another end engaged with a micro switch 16 which may be triggered to generate cursor input signals.

The universal joint 14 is used to couple the free end 1131 of the encoder rod 113 and the encoder input transmission member 12, and it is to be an elastic transmitting member between them. It may be made of any elastic material such as a rubber or the like for transmitting external turning application from the key member 11 to the encoder 15, or for being bent and tilted sideward.

When no external force is applied to the key member 11, the cursor rod 114 and the cursor input pressing member 13 could maintain a gap in between. When the key member 11 is turned, the turning force will be transmitted to the encoder 15 through the encoder rod 113, the universal joint 14 and the encoder input transmission member 12 to further trigger the encoder 15 for generating encoding signals. At this moment, the cursor rod 114 does not affect the cursor input pressing member 13 so that the micro switch 16 can remain inactive.

When depressing the key member 11 from the top end 111 eccentrically, the cursor rod 114 at the depression side will be tilted downward and a sideward bending will occur at the universal joint 14 to make the bottom end of the cursor rod 114 depressing upon the rocker arm 131 which consequently triggers the micro switch 16 thereunder for generating a corresponding cursor input signal. When the depressing force is removed, the elastic universal joint 14 will bounce back to the upright position as shown in FIG. 3 so that different types of turning and pressing force upon the key member 11 will produce respective input signals for encoding or cursor control usage. By providing the present invention, possible mistaken input as mentioned in the conventional device can be avoided.

Figure 4:
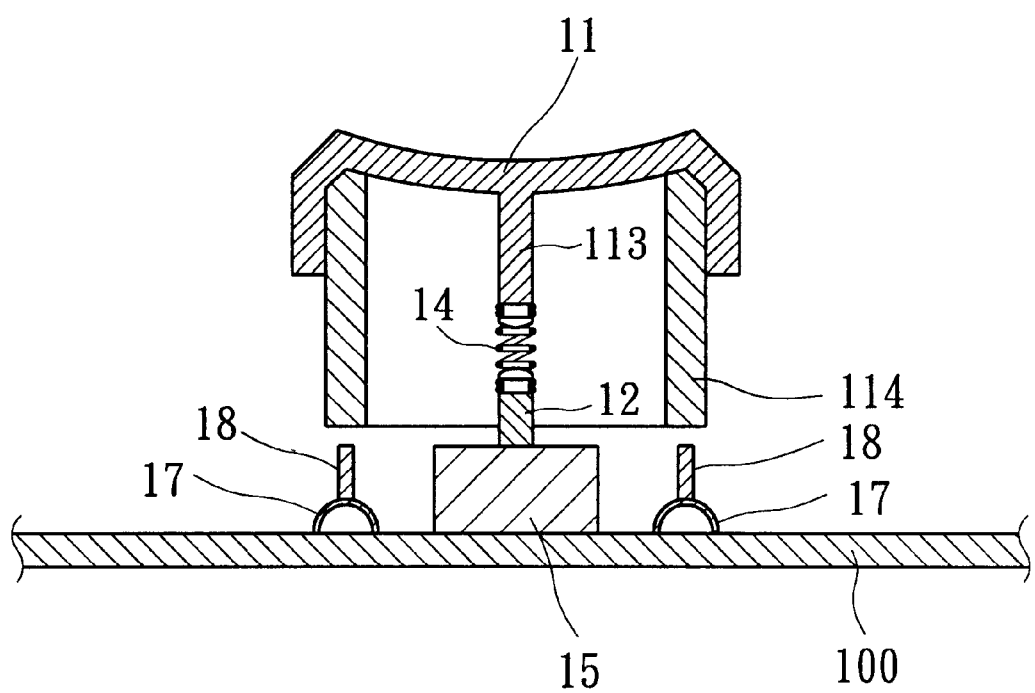
FIG. 4 is a sectional view of a second embodiment of this invention.

FIG. 4 shows a second embodiment of this invention. It is largely constructed like the first embodiment shown in FIG. 3, except following features. First, the universal joint 14 is embodied as a spring rather than a part made of an elastic material. Second, the cursor rod 114 is formed like a hollow barrel having a top end engaged within a top rim of the key member 11. Third, the micro switch 17 is arch shaped with a stem 18 located on a top end thereof to space from the bottom end of the cursor rod 114. Yet, the second embodiment works essentially same as the first embodiment.

Figure 5:
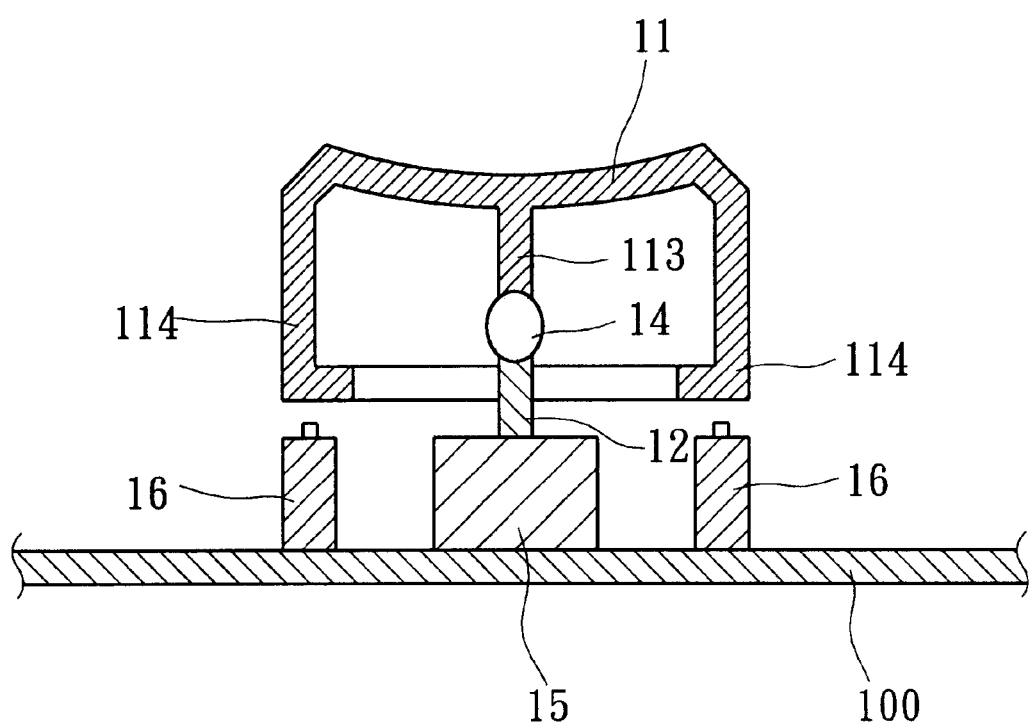
FIG. 5 is a sectional view of a third embodiment of this invention.

FIG. 5 illustrates a third embodiment which is also largely like the first embodiment shown in FIG. 3. However, the elastic universal joint 14 is fixedly engaged at both ends with the encoder rod 113 and the encoder input transmission member 12. The cursor rod 114 has an inward flange at the bottom end. The cursor input pressing member 13 is omitted. The micro switch 16 is spaced from the bottom flange of the cursor rod 114 and may be triggered by the bottom flange of the cursor rod 114 directly. It may thus further simplify the construction and reduce cost of the present invention. Also by providing this invention, both encoding and cursor functions may be combined into a single mechanism that the surface space needed on a control panel can be greatly reduced.

It may thus be seen that the objects of the present invention set forth herein, as well as those made apparent from the foregoing description, are efficiently attained. While the preferred embodiments of the invention have been set forth for purpose of disclosure, modifications of the disclosed embodiment of the invention as well as other embodiments thereof may occur to those skilled in the art. Accordingly, the appended claims are intended to cover all embodiment which do not depart form the spirit and scope of the invention.

What is claimed is:

1. A cursor mechanism with encoding function, comprising:
   a) a key member having:
      i) a key member top;
      ii) a key member bottom;
      iii) an encoder rod having a free end, the encoder rod protruding from a center of the key member bottom; and
      iv) at least one cursor rod protruding from the key member bottom and being annularly spaced from the encoder rod;
   b) an encoder having an encoder input transmission member, the encoder input transmission member having a first end connected to the encoder;
   c) at least one signal generating member positioned below the at least one cursor rod; and
   d) a universal joint adjoining the free end of the encoder rod and a second end of the encoder input transmission member, wherein the at least one signal generating member produces a first signal when engaged by the at least one cursor rod when the key member is tilted and the encoder produces a second signal when the key member is turned.

2. The cursor mechanism with encoding function according to claim 1, wherein the at least one signal generating member comprises a micro switch.

3. The cursor mechanism with encoding function according to claim 1, further comprising:
   at least one cursor input pressing member having a rocker arm having an elastic member, the at least one cursor input pressing member being positioned below the at least one cursor rod, the rocker arm being connected to the at least one signal generating member and the elastic member being connected to the encoder.

4. The cursor mechanism with encoding function according to claim 1, wherein the universal joint comprises a flexible rubber sleeve.

5. The cursor mechanism with encoding function according to claim 1, wherein the universal joint comprises a spring.

6. The cursor mechanism with encoding function according to claim 1, wherein the at least one cursor rod includes an inward flange.

7. The cursor mechanism with encoding function according to claim 1, wherein the at least one cursor rod comprises a cylinder.

8. The cursor mechanism with encoding function according to claim 1, wherein the at least one signal generating member is arched shape and has a stem on a top thereof.

* * * * *